United States Patent Office 2,736,407
Patented Feb. 28, 1956

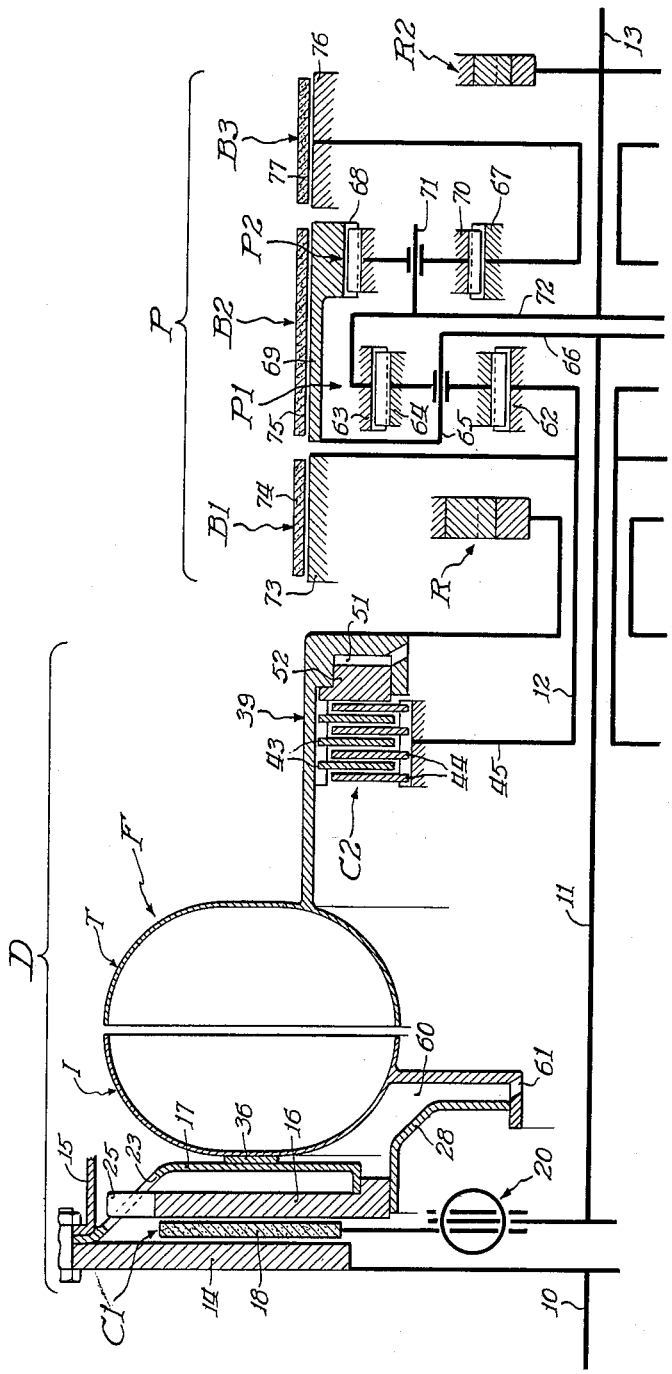

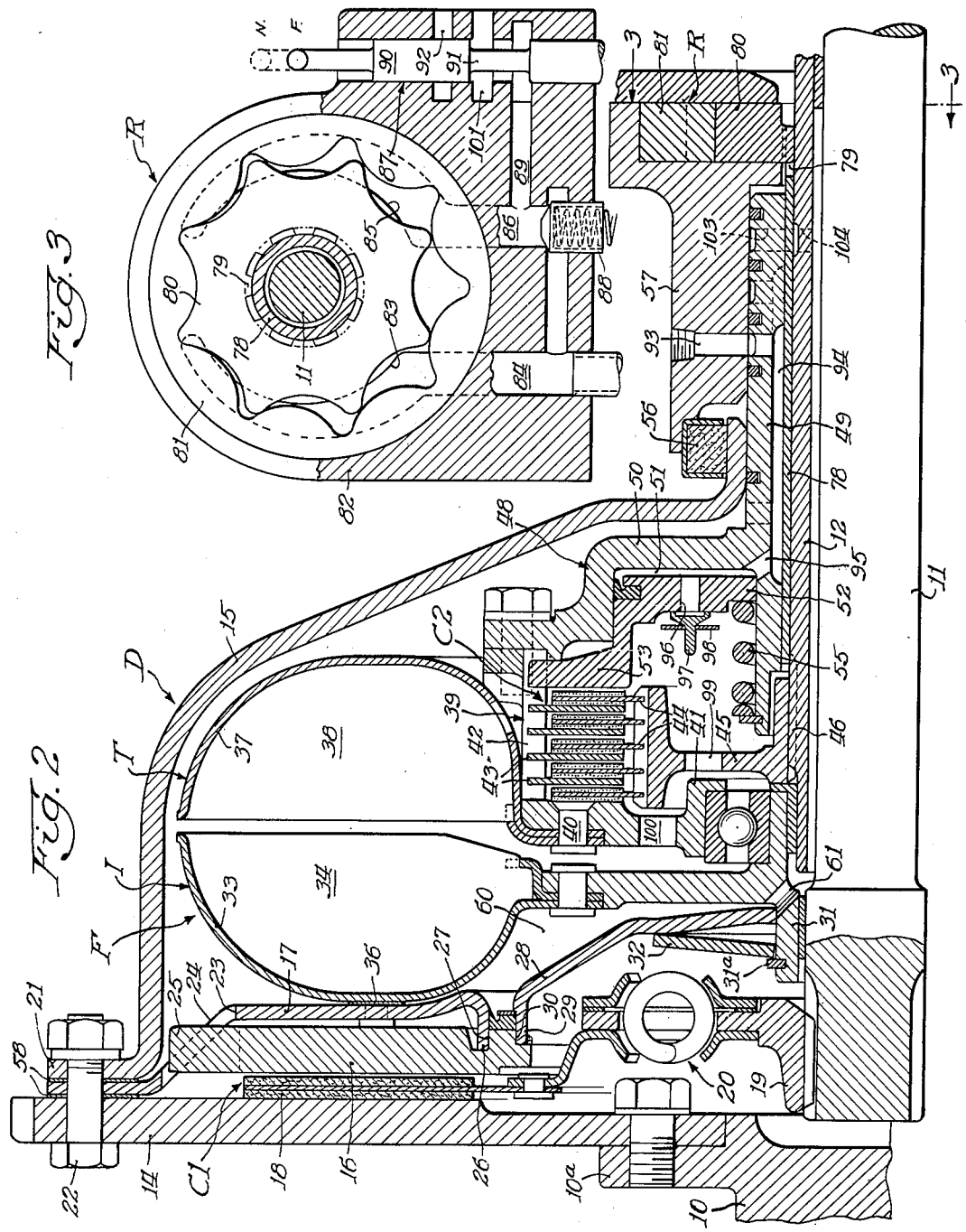

2,736,407

TRANSMISSION

Richard L. Smirl, La Grange, Ill., assignor to Borg-Warner Corporation, Chicago, Ill., a corporation of Illinois Application December 19, 1949, Serial No. 133,873

3 Claims. (Cl. 192—3.2)

This invention relates to variable speed transmissions and, more particularly, to such transmissions for use in motor vehicles, although suitable for other purposes.

An object of the invention is to provide a new and improved change-speed transmission embodying drive mechanism, gearing, and controls therefor affording a suitable plurality of forward speed ratios for motor vehicles.

Another object of the invention is to provide such a change-speed transmission embodying planetary gearing connected to the load and a drive mechanism connected to power means and controllable to provide parallel torque paths between the power means and the gearing.

Another object of the invention is to provide an improved transmission for motor vehicles and embodying change-speed planetary gearing, and a drive mechanism featuring coupling devices operable to selectively provide a fluid power-transmitting connection or a mechanical power-transmitting connection between the vehicle engine and the gearing.

A further object of the invention is to provide an improved transmission for motor vehicles embodying change-speed gearing and a drive mechanism featuring coupling means releasably connecting the vehicle engine to input shafts of the gearing, one of the coupling means comprising a fluid-operated friction coupling directly connecting the engine and one of the input shafts, and the other coupling means comprising a fluid coupling and fluid-operated friction clutch arranged in series between the vehicle engine and the other input shaft, one of the vaned elements of the fluid coupling being drivingly connected to a fluid pump supplying pressure fluid to engage the friction clutch for completing the drive between the fluid coupling and the other input shaft and also optionally to engage the friction coupling.

Another object of the invention is the provision of a new and improved transmission embodying change-speed gearing and a drive mechanism including fluid and friction couplings arranged in series between power means and the gearing, the fluid coupling being drivingly connected to the power means and the engagement and release of the friction coupling being controlled by means responsive to the speed of the turbine element of the fluid coupling for releasably connecting the fluid coupling to the gearing.

Another object of my invention is to provide an improved drive control mechanism for motor vehicle and other transmissions and comprising a fluid coupling connected to an engine-driven shaft and also having fluid-operated friction-engaging means between the fluid coupling and a drive shaft, and fluid pressure means operating in response to a predetermined speed of the driven member of the fluid coupling for automatically controlling the friction-engaging means and thereby the drive connection between the fluid coupling and the drive shaft, the arrangement being such that the friction-engaging means is partially engaged at engine-idling speeds and is instrumental in dividing the slip of the fluid coupling between the fluid coupling and the friction-engaging means thereby substantially reducing the drag torque of the fluid coupling on the drive shaft and being effective to automatically connect the fluid coupling to the drive shaft for positively driving the latter at increasing speeds upon increased speeds of the engine and with but a relatively small amount of slip between the engine and the drive shaft. A further feature of the control arrangement resides in operator-controlled means for disconnecting the fluid coupling at any time irrespective of engine speed.

A still further object of the invention is to provide an improved drive mechanism and controls therefor comprising a fluid coupling and fluid pressure-operated friction-engaging means arranged in series between driving and driven members, and a pump driven from the turbine member of the fluid coupling and supplying fluid under pressure to the friction-engaging means to provide an inherent engagement and release of the latter in response to the speed of the turbine member.

A further object of the invention is to provide an improved drive mechanism and controls therefor, particularly for use with variable vehicle speed transmissions and adapted to connect engine-driven and reduction gearing shafts, the drive mechanism embodying a fluid coupling and a fluid-operated mechanical coupling arranged in series between the shafts and wherein the fluid coupling comprises an impeller drivingly connected to the engine-driven shaft and a turbine drivingly connected to a pump and thereby supplying fluid under pressures variable in accordance with the speed of rotation of the turbine for controlling engagement of the mechanical coupling to effect a slipping driving connection between the fluid coupling and the reduction gearing shaft at engine-idling speeds whereby to divide the slip of the fluid coupling between the fluid coupling and mechanical coupling to reduce the inherent drive or drag effect of the fluid coupling and to effect full engagement of the mechanical coupling at engine speeds above idling speed so that the fluid coupling will be fully effective to actuate the reduction gearing under substantial engine torques. An advantageous feature of this arrangement resides in the initial engagement of the mechanical coupling at engine-idling speeds and before the vehicle starts to move providing a smooth engagement of the starting speed ratio when the throttle is opened to start the vehicle in motion, and full engagement of the mechanical coupling will be realized upon a slight increase in the pump speed by the impeller which causes the pump to provide sufficient pressure to fully engage the mechanical coupling, so that for all practical purposes the fluid coupling will be the starting device under heavy torques. Under engine-idling conditions and when the transmission is in low gear, the mechanical coupling will be engaged, by the pressure developed in the pump, only to a point which permits the pump to rotate at a sufficient speed to handle the drag torque of the fluid coupling. Since this divides the slip at engine-idling speed between the mechanical and fluid couplings, it will tend to reduce the creep experienced in low gear. When the throttle is opened, however, most of the slip will occur in the fluid coupling, since the pump need only to turn sufficiently fast to maintain pressure in the mechanical coupling and any additional engine speed will increase this pressure so that it will be a self-determining function.

The invention consists of the novel constructions, arrangements and devices to be hereinafter described and claimed for carrying out the above-stated objects and such other objects as will appear from the following description of a preferred embodiment of the invention illustrated with reference to the accompanying drawings in which:

Fig. 1 is a diagrammatic illustration of a transmission embodying the principles of the invention;

Fig. 2 is a longitudinal sectional view of the drive mechanism and controls therefor illustrated in Fig. 2; and Fig. 3 is a section taken on line 3—3 of Fig. 2.

Referring now to the drawings for a detailed description of the invention and referring first to Fig. 1, the transmission comprises a drive mechanism indicated generally at D and a planetary gear set indicated at P, the drive mechanism comprising a friction clutch indicated at C1 affording a driving connection between the crankshaft 10 of a vehicle engine (not shown) and an intermediate shaft indicated at 11, the drive mechanism also including a fluid coupling indicated generally at F and a friction clutch C2 arranged in series and adapted to provide a driving connection between the engine crankshaft 10 and a quill shaft 12. The planetary gear set P comprises the planetary gear unit generally indicated at P1 and the planetary gear unit generally indicated at P2, the shafts 11 and 12 being connected to the planetary gear unit P1. The planetary gear set P is provided with a plurality of control devices in the form of friction brakes generally indicated at B1, B2, and B3 for controlling the gear set P and acting in conjunction with the drive mechanism D to drive the driven shaft 13 of the transmission relative to the crankshaft 10 at a plurality of forward speed ratios and also reversely with respect to the direction of rotation of the crankshaft 10.

Referring now, more particularly, in greater detail to the drive mechanism D and the planetary gear set P and referring first to the drive mechanism D in Figs. 1 and 2, and particularly to the details of its structure shown in Fig. 2, the drive mechanism comprises an annular flywheel 14, fixed to a radially extending flange 10a on the crankshaft 10 by means of bolts as shown. The outer extremity of the flywheel has an annular bell-shaped housing 15 connected thereto and in which are disposed the clutches C1 and C2 and the fluid coupling F.

The clutch C1 comprises an annular pressure plate 16 located concentrically of the shaft 11 on an annular stamping or plate 17 for axial movement to and from a driven friction plate 18 which is adapted to be engaged by the inner face of the flywheel 14 and the pressure plate 16 upon movement of the pressure plate 16 toward the driven plate 18. The driven plate 18 has a hub portion 19 splined to the shaft 11 and is also provided with a conventional vibration dampening arrangement indicated at 20. The mounting plate 17 for the pressure plate 16 is secured at its outer periphery between the flywheel and a radially extending flange 21 of the housing 15 by means of a plurality of bolt and nut assemblies, one of which is shown at 22. The mounting plate 17 is a drum-like stamping having a plurality of circumferentially spaced openings 23 in an angularly disposed portion 24 thereof receiving lugs 25 projecting radially outward on the pressure plate 16 to provide a driving connection between the flywheel 14 and the pressure plate 16. The mounting plate 17 is also provided at its inner periphery with an axially extending flange 26 received within an annular groove 27 in the pressure plate 16 for slidably mounting and guiding the pressure plate in its movement relative to the plate 17 to and from the driven plate 18. The clutch C1 is adapted to be operated by fluid pressure means to effect engagement of the same, and the means comprise a piston in the form of an annular plate 28 having an axially extending peripheral flange 29 disposed within a recess 30 of the pressure plate 16 at its radially inner edge and secured to the plate 16 for moving it to and from the driven plate 18. The piston 28 surrounds and is slidably mounted upon a hub 31 and is actuated by fluid pressure to engage the clutch C1 to provide a driving connection between the flywheel 14 and the shaft 11. A Belleville washer type spring 32 also surrounds the hub 31 and has its inner peripheral edge engaging a lock washer 31a positioned in a groove in the hub, the radially outer edge of the spring engaging the piston 28 for moving the piston to disengage the pressure plate 16 from the driven plate 18, upon release of pressure fluid on the piston 28.

Referring to the fluid coupling F and the clutch C2 providing a driving connection between the flywheel 14 and the quill shaft 12, the fluid coupling F comprises an impeller I of conventional design including a semi-toroidal shell 33 and a plurality of vanes, one of which is shown at 34, the hub 31 of the impeller being rotatably mounted on the shaft 11 and the quill shaft 12 as clearly shown in Fig. 2. The shell 33 of the impeller is connected at 36 to the mounting plate 17 for rotation therewith and the flywheel 14 upon rotation of the flywheel 14. The turbine T of the fluid coupling F comprises a semi-toroidal shell 37 and a plurality of vanes, one of which is shown at 38. As is well known in the fluid coupling art, the vanes in each of the impeller and turbine elements of the fluid coupling define with their respective shells a plurality of fluid passages in the coupling for obtaining a toroidal circulation of fluid in the coupling, upon rotation of the impeller by the flywheel 14, and transfer of torque from the impeller to the turbine of the fluid coupling to effect rotation of the turbine.

The support for the shell 37 and vanes 38 of the turbine comprises an annular drum 39 surrounding the shafts 11 and 12 and secured to the radially inner edge portions of the shell 37 by rivets 40. The drum has its radially inner periphery providing a hub 41 for the turbine rotatably mounted by means of ball bearings on the hub 31 of the impeller. The cylindrical portion 42 of the drum 39 forms a portion of the friction disc-type clutch C2, as a plurality of clutch discs 43 of the clutch C2 are disposed within and fixed to the portion 42 of the drum 39. The clutch C2 further comprises a plurality of driven discs 44 secured to a carrier 45 splined as at 46 to the quill shaft 12 for rotation therewith. The drum 39 has secured thereto a support and distributor member 48 having a sleeve portion 49 rotatably mounted on the quill shaft 12 and a radially extending portion 50 secured to the drum 39 by bolts, as shown, and defining with the sleeve portion 49 a pocket 51 receiving an annular piston 52 having a radially extending actuating portion 53 thereof provided with a toothed periphery received within slots in the drum 39 to provide a driving connection between the drum 39 and the piston 52, while permitting axial movement of the piston to effect engagement and disengagement of the clutch discs 43 and 44 by the radially extending portion 53 of the piston 52, as will be obvious from an inspection of Fig. 2. Movement of the piston to engage the clutch C2 is obtained upon the admission of pressure fluid into the pocket or fluid pressure chamber 51 and movement of the piston 52 toward the left as viewed in Fig. 2. Upon release of fluid pressure in the chamber 51, a spring 55, surrounding the sleeve portion 49 of the member 48 and compressed upon the clutch-engaging movement of the piston 52, will operate to move the piston 52 to the right as viewed in Fig. 2 to effect release of the clutch C2. It will be apparent from this description of the fluid coupling F and the clutch C2 that the same are arranged in series between the shafts 10 and 12 and that the clutch C2 must be engaged to transmit drive from the shaft 10 to the shaft 12, the fluid coupling being otherwise ineffective to transmit drive to the quill shaft 12.

It may be noted from an inspection of Fig. 2 that the radially inner periphery of the housing 15 is rotatably mounted upon the sleeve portion 49 of the member 48 and a seal 56 is interposed between the radially inner periphery of the housing 15 and a stationary sleeve-like portion 57 of the transmission. The outer periphery of the plate 17 is provided with annular fluid seals 58 between the same and the flywheel 14 and the flange 21 of the housing 15. An oil-tight chamber is thus provided within which are disposed the clutch C1, the fluid coupling F, and the clutch C2 and, since the chamber is filled with oil, the clutch C1, the fluid coupling F, and the clutch C2 will rotate in the oil. In addition, it may be noted that the plate 17, the piston 28, and the inner periphery of the shell 33 and hub 31 define an oil chamber 60 so that, upon the introduction of oil under pressure through the opening 61 in the hub 31 of the impeller, the piston 28 will be moved toward the left to effect engagement of the pressure plate 16 with the driven plate 18 of the clutch C1. Upon the release of pressure fluid in the chamber 60, the spring 32 will be effective to return the piston 28 to its normal position to thereby release the engagement of the clutch pressure plate 16 with the driven plate 18.

The drive mechanism D, as thus described, is effective through its clutch C1 to provide a driving connection between the crankshaft 10 and the shaft 11 and is also effective to provide a driving connection between the crankshaft 10 through the fluid coupling F and the clutch C2 to the quill shaft 12. As previously described, the latter driving connection can only become operative upon engagement of the clutch C2 inasmuch as the turbine of the fluid coupling is not effective to transmit torque to the quill shaft 12 until the friction clutch C2 is engaged, this arrangement being particularly advantageous in transmissions embodying fluid couplings, as will be later described.

The planetary gear unit P comprises the planetary gear sets P1 and P2. The planetary gear set P1 comprises a sun gear 62 connected to the adjacent end of the sleeve shaft 12, a ring gear 63, a series of planet pinions 64 meshing with the sun and ring gears 62 and 63, the pinions being rotatably mounted on shafts 65 of a planet gear carrier 66 connected for rotation with the shaft 11. The planetary gear set P2 comprises a sun gear 67 rotatably mounted on the driven shaft 13; a ring gear 68 provided on the drum 69 of the brake device B2 and to which the stub shafts 65, mounting the planet pinions 64, are connected for rotation therewith and the planet carrier 66; and a series of planet pinions 70 rotatably mounted on stub shafts 71 fixed to a carrier 72 connected to the output shaft 13 and also connected to the ring gear 63 of the gear set P1.

Referring to the brake devices B1, B2, and B3 controlling the planetary gear sets P1 and P2 to provide the various speed ratios and reverse drive, the brake device B1 comprises a drum 73 coupled to the sun gear 62 of the gear set P1 and adapted to have applied thereto a brake band 74 to prevent rotation of the sun gear which thus provides a reaction point for the establishment of one of the speed ratios. The brake device B2 is adapted to hold stationary the carrier 66 of the gear set P1 and also the ring gear 68 of the gear set P2 to provide reverse drive and comprises the drum 69 and a brake band 75 engageable with the drum 69. The brake device B3 comprises a drum 76 connected to the sun gear 67 of the gear set P2 and adapted to be engaged by a brake band 77 for holding the sun gear against rotation to provide a reaction point for the establishment of two underdrive speed ratios.

Describing the operation of the transmission, it will be assumed that the operators are in control of the fluid pressure directing systems for effecting actuation of the clutches C1 and C2 and the brake devices B1, B2, and B3. At this time, the controls for operating the clutches and brake devices have not been actuated by the operator and, therefore, a neutral condition of the transmission will exist. It may be noted at this time that the flywheel 14 is driving the impeller I of the fluid coupling F which is operative to rotate the turbine T of the fluid coupling at engine-idling speed, the turbine of the fluid coupling being ineffective to transmit drive to the shaft 12 inasmuch as the clutch C2 is disengaged at this time.

To obtain first or low speed ratio, fluid under pressure is directed to the fluid chamber 51 to effect actuation of the piston 52 to engage the clutch C2. With the clutch C2 engaged, the turbine T of the fluid coupling is effective to transmit drive through the friction clutch C2 to the shaft 12. The brake device B3 is engaged to hold the sun gear 67 against rotation to provide a reaction point for establishing low speed ratio. With the sun gear 67 held stationary, drive will be transmitted from the sleeve shaft 12 and to the sun gear 62 fixed thereto, planet pinions 64, and ring gear 63 to effect rotation of the driven shaft 13 at low speed.

To provide second speed ratio, the brake device B3 may be maintained in operative condition, the clutch C2 is released, and the clutch C1 is engaged. To effect engagement of the clutch C1, fluid under pressure is directed into the chamber 60 to cause actuation of the piston 28 and thereby the pressure plate 16 to engage the clutch C1. Drive will thus be transmitted from the crankshaft 10 through the engaged clutch C1 to the shaft 11 which will rotate the carrier 66 of the gear set P1. As the brake B3 is operative, the sun gear 67 will be effective to establish a reaction causing the ring gear 63 and driven shaft 13 to rotate forwardly in second speed ratio.

Third speed ratio or direct drive is provided by releasing the brake device B3 and engaging the clutch C2 so that both of the clutches C1 and C2 will be engaged. In this condition of the transmission, it will be apparent that there will be parallel torque paths between the crankshaft 10 and the gear unit P inasmuch as the engaged clutch C1 will drivingly connect the shafts 10 and 11 and the fluid coupling F and engaged clutch C2 will drivingly connect the crankshaft 10 with the quill shaft 12, both of the shafts 11 and 12 thus rotating in unison and effecting rotation of the sun gear 62 and carrier 66 of the planet gear set P1 so that the gear set P1 will be locked up and, accordingly, the ring gear 63 thereof and the driven shaft 13 will be driven at the same speed as the drive shaft 10.

The transmission is adapted to provide a fourth speed or overdrive ratio and, for this purpose, the clutch C1 is allowed to remain engaged, the brake device B1 is engaged, while the clutch C2 is disengaged. With engagement of the brake device B1, the brake band 74 will grip the brake drum 73, with the result that the sun gear 62 of the gear set P1 will become stationary to provide a reaction point for conditioning the planetary gear set P1 to effect drive of the driven shaft 13 at a speed greater than that of the crankshaft 10, clutch C1, shaft 11 and carrier 66 of the gear set P1 being rotated at the same speed, it will be apparent that the stationary sun gear 62 is effective to cause the ring gear 63 and thereby the driven shaft 13 to be rotated at an overdrive speed.

To obtain reverse drive, the clutch C2 is engaged and the brake device B2 is operated to hold the drum 69, planet carrier 66, and ring gear 68 against rotation. Drive will be transmitted from the crankshaft 10 through the fluid coupling F and engaged clutch C2 to the shaft 12 connected to the sun gear 62 and, as the planet carrier 66 is stationary, forward rotation of the sun gear 62 will cause the planet pinions 64 to rotate the ring gear 63 and thereby the driven shaft 13 in a direction opposite to that of the direction of rotation of the drive shaft or crankshaft 10.

It will be apparent, from the foregoing description of the operation of the transmission, that the low speed ratio condition of the transmission provides a drive utilizing the fluid coupling F of the drive mechanism D which is desirable in smoothly starting the motor vehicle. In a power transmission embodying a fluid coupling capable of continuously driving planetary gearing, when the engine is at an idling speed, there is an inherent drive or drag effect produced by the fluid coupling causing transmission of torque to the gearing resulting in objectionable creeping of the vehicle. Thus, while a fluid coupling is desirable in giving a smooth start to a motor vehicle, the drag effect of the fluid coupling is an obvious disadvantage in the use of a fluid coupling in an automotive transmission. To obviate this undesirable feature of such transmission, the present drive mechanism contemplates the provision of fluid pressure means, preferably operating in response to the speed of the turbine of the fluid coupling, for automatically controlling and effecting a driving connection between the turbine of the fluid coupling and the planetary gearing at speeds above the idling speed of the engine. More particularly, the fluid pressure means automatically control the friction clutch C2 for completing the driving connection between the fluid coupling F and the gearing P only at such time when the operator desires to effect movement of the vehicle by acceleration of engine speed, the arrangement also contemplating that the speed-responsive fluid pressure means provide variable fluid pressures for actuating the clutch C2, in response to the speed of rotation of the turbine of the fluid coupling for controlling the degree of engagement of the clutch C2 so that, for example, the slip, at engine-idling speed, between the fluid coupling and the clutch C2 is divided, whereby the drag of the torque converter is substantially reduced.

The fluid pressure means comprise a pump R connected to and energized by the turbine of the fluid coupling and responsive to varying speeds thereof to provide fluid under variable pressure directed to the piston of clutch C2. As the turbine of the fluid coupling F rotates in response to rotation of the impeller I of the fluid coupling, increased speed of rotation of the crankshaft 10 and impeller I by the engine will cause the speed of the turbine T of the fluid coupling and thereby the pump R to be accelerated, with the result that the pump R will provide increasing fluid pressure on the piston 52 causing the piston to apply full pressure on the clutch C2 to automatically connect the turbine of the fluid coupling with the quill shaft 12 for effecting rotation of the latter at substantially the same speed as the crankshaft 10. Thus, while the variable pressures acting upon the piston of the clutch C2 will be effective to divide the slip at idling speeds between the fluid coupling and the clutch C2 to reduce the drag effect of the fluid coupling to insure smooth starting of the vehicle, the fluid coupling will, for all practical purposes, be the starting device under heavy torques when the engine is accelerated above idling speed to effect an increased speed of rotation of the crankshaft 10.

Referring more particularly to Figs. 2 and 3 for a description of the foregoing described advantageous arrangement, the turbine T of the fluid coupling, as previously described, is directly connected to the drum 39 carrying the driving clutch plates 43, and it may be noted that the drum 39 is connected to the piston-supporting and pressure fluid-distributing member 48 for rotation therewith. The crankshaft 10 thus is effective to continually rotate the impeller of the fluid coupling which thereby drives the turbine of the fluid coupling, the drum 39, and the member 48. The sleeve portion 49 of the member 48 is splined to a sleeve 78 surrounding and rotatably mounted on the quill shaft 12 and one end of this sleeve 78 is splined as at 79 to a toothed rotor 80 of the pump R, the rotor 80 of the pump R engaging a cooperating rotor 81 which generally corresponds to the shape of the rotor 80 but which has a greater number of depressions than the projections or teeth on the rotor 80. The rotors 80 and 81 are enclosed in a casing 82. The pump R is of well-known variety and, when operating in a counter-clockwise direction, as shown in Fig. 3, the space between the two rotor elements on the left-hand side, as the figure is viewed, and as illustrated at 83, opens to receive liquid from a passage 84 connected to an oil sump (not shown) of the transmission, and it may be noted that the space on the other side or right-hand side between two elements as indicated at 85 closes, for placing the fluid, received in the pump, under pressure for transmission to a duct 86 in the casing connected to a valve generally indicated at 87. The pump casing is provided with a conventional fluid pressure relief valve indicated at 88 for releasing fluid under excessive pressures to the oil inlet 84 of the pump.

Fluid under pressure flows from the duct 86 to the valve 88 through a passage 89, and the movable valve body 90 is provided with a reduced portion 91 permitting the flow of the pressure fluid through an opening 92 in the pump casing 82 to a pipe (not shown) connected to the conduit 93 in the valve body as shown in Fig. 2. The fluid passes through a passage 94, defined by the sleeve 49 and sleeve 78 rotatable conjointly, and through an opening 95 to the fluid pressure chamber 51 to effect actuation of the piston 52 and engagement of the clutch C2.

It will be readily apparent from an inspection of the described hydraulic control arrangement that, as the turbine T of the fluid coupling F and the rotor 80 of the pump R rotate simultaneously, the pressure of the oil, delivered by the pump to the piston 52, will vary proportionately to the speed of rotation of the turbine. Considering this arrangement when the engine is idling, the impeller is rotated slowly at this time, and, consequently, the turbine will be similarly rotated to drive the rotor 80 of the pump R to supply fluid under pressure to the piston 52. Assuming the planetary gearing is in its low gear condition, the clutch C2 will be closed by the fluid pressure developed in the pump only to a point which permits the clutch to rotate at a sufficient speed to handle the drag torque of the fluid coupling. Since this divides the slip, at idling speeds of the engine, between the clutch C2 and the fluid coupling, it tends to reduce the transmission of torque to the gearing P and consequent creeping of the vehicle otherwise experienced when the transmission is conditioned for low speed ratio, especially under cold weather conditions. Also, it removes any sudden engagement of the clutch and shock or bump in initial drive, since the clutch is already initially engaged before the motor vehicle starts to move. When the throttle of the engine is opened to cause the engine speed to be higher than its engine idling speed, most of the slip will occur in the fluid coupling, since the pump need only to turn sufficiently fast to maintain pressure in the clutch C2 and any additional speed will increase this pressure so that it will be a self-determining function. This is due to the fact that only a slight increase in the pump speed will create full fluid pressure on the clutch and prevent abuse of the clutch, so that for all practical purposes the converter will be the starting device under heavy torques and the clutch and fluid coupling will act in series under engine idling torque. In other words, when the fluid coupling is started, there will only be a couple of hundred revolutions per minute of slip in the clutch and the rest in the fluid coupling. However, this does not appreciably change the stall speed of the fluid coupling and, in fact, might even reduce the stall speed of the coupling, because the fluid coupling, as tests have proven, will show a slight reduction of input speed when the turbine is permitted to turn slowly when compared to the condition when the turbine is held stationary.

It will be seen from the foregoing explanation that the arrangement of the turbine T and clutch C2 in series, with the turbine element of the fluid coupling operative to drive a pump supplying variable fluid pressure to the clutch, provides advantageous features desirable in transmissions embodying fluid couplings, for example, reduction of the drag of the fluid coupling causing the vehicle to creep when the engine idles, and providing for the full torque-transmitting operation of the fluid coupling when it is desired to start the motor vehicle in low gear.

Referring to Fig. 2, it may be noted that the piston 52 of the clutch C2 is provided with a passage 96 extending therethrough axially thereof and communicating with the fluid pressure chamber 51. The other end of the passage 96 communicates with the interior of the piston and is normally closed by a valve 97 and leaf spring 98, the spring engaging the valve 97 and urging it toward the piston to normally close the passage 96. When the pump is operating at capacity, the pressure fluid will move the valve 97 to open the passage 96 to permit the fluid to flow into the interior of the piston and through an opening 99 in the hub 45 and an opening 100 in the hub 49 of the turbine of the fluid coupling and radially outwardly into the space between the impeller and runner of the fluid coupling and through the coupling for cooling purposes. This feature is of considerable advantage in substantially reducing the high temperature of the pressure fluid in the fluid coupling which is normally realized in the operation of a fluid coupling.

A further feature of my improved drive mechanism is the provision of a control mechanism for preventing engagement of the clutch C2 during acceleration of the engine above idling speed, for example, when acceleration is desirable, such as in cold weather in starting the engine. The control mechanism comprises the valve body 90 of the valve 87, which may be manually controlled by suitable linkage connected to the valve body 90 and a neutral and speed ratio control lever operated by the driver, the valve body 90 being movable from its position F, shown in Fig. 3, to the position N thereof indicated in dotted lines in said figure to prevent the flow of fluid under pressure from the pump through the passage 92 and 93 to the piston 52, the fluid in the chamber 51 and passages 95, 94, 93, and 92 being exhausted through the passage 101 in the pump casing 82 to the sump of the transmission casing. When the engine is operating smoothly at idling speed, the valve body 90 may then be moved to its F position, shown in Fig. 3, to permit fluid under pressure to be delivered by the pump to the clutch C2 to start the vehicle.

It may be noted from an inspection of Fig. 1 that a pump R2, similar to the pump R, is connected to the driven shaft 13 and driven thereby. Upon rotation of the driven shaft in low speed ratio, the pump R2 operates to supply fluid under pressure to the clutch C1 through conduits (not shown) connected to the passage 103 in the distributor member 48 and passage 104 in the shaft 12, the fluid flowing between the shafts 11 and 12 into the passage 61 and the chamber 60 of the clutch C1 to effect operation of the clutch C1.

It will be seen from the foregoing description that I have provided an improved transmission and embodying a drive mechanism employing a fluid coupling, and fluid-operated friction-engaging means between the fluid coupling and the transmission-input shaft and engageable by fluid pressure means operating in response to a predetermined speed of rotation of the driven member of the fluid coupling for automatically controlling engagement of the friction-engaging means, and thereby the drive connection between the fluid coupling and transmission. While I have described the drive mechanism as comprising a fluid coupling of the non-torque converting type, it will be clearly apparent that the clutch and control mechanism therefor could equally well be applied to the turbine or runner element of a hydrodynamic coupling device of the torque-converting type and, therefore, it is to be understood that where I refer to the term "fluid coupling" in the appended claims, I intend to include not only fluid couplings of the non-torque converting type but also of the hydrodynamic or torque ocnverting type. Accordingly, various other applications of my improved drive mechanism and control means therefor will be readily apparent from the foregoing illustrative embodiment and also various changes in the details of construction and mode of operation may be apparent from my description, and it is not my intention to limit my invention apart from the scope afforded by the appended claims within the broader aspects of my invention.

I claim:

1. In a transmission, a drive member, a driven shaft, and a hydrokinetic device and friction clutch arranged in series between and drivingly connecting said driven shaft to said drive member upon engagement of said clutch, said kinetic device comprising an impeller connected to said drive member, and a turbine rotatable relative to said drive member and driven shaft, said turbine having a hub, a drum-like member connected to said hub, said friction clutch comprising a plurality of driving clutch plates disposed within said drum-like member and connected thereto for rotation therewith, a plurality of driven clutch plates connected to said driven shaft and engageable with said driving clutch plates, a piston connected for rotation with said drum-like member and movement axially thereof to engage said driving and driven clutch plates, a source of fluid supply, a pump connected to said source, and a housing for said piston and providing a pressure fluid chamber adapted to receive fluid under pressure to move said piston to engage said clutch, said housing having a passage therein communicating with said chamber and being connected to said drum-like member and said pump for driving said pump to supply fluid under pressure through said passage to said pressure fluid chamber.

2. In a transmission, drive and driven members; a friction clutch comprising drive plates, and driven plates connected to said driven member, said drive member comprising a drum receiving said drive plates and connected thereto, a piston drivingly connected to said drum and operable to move said drive and driven plates into engagement, a housing for said piston and connected to said drum, said housing defining a pressure fluid chamber receiving said piston and having an opening therein providing a passage for fluid under pressure into said chamber; spring means surrounding said driven member and engaging said piston and urging said piston toward clutch-disengaging position, said piston having a passage therein, and a valve in said piston adapted to normally close said piston passage during the entry of pressure fluid into said fluid chamber and movement of said piston to engage said plates and operative thereafter to open said passage when the pressure of the fluid in said chamber exceeds a predetermined value.

3. In a transmission, drive and driven members, a friction clutch comprising engageable parts respectively connected to said drive and driven members, pressure fluid means operative to engage said clutch parts and comprising a piston for engaging said clutch parts and having a passage therethrough, a housing for said piston and defining a pressure fluid chamber receiving said piston, and a valve carried by said piston spring means acting on said valve to close said passage and yielding upon movement of said valve to open said passage when the pressure of the fluid in said chamber exceeds a predetermined value.

References Cited in the file of this patent

UNITED STATES PATENTS

| | | |
|---|---|---|
| 1,938,914 | Kress | Dec. 12, 1933 |
| 2,002,367 | Fahrney | May 21, 1935 |
| 2,068,062 | Metten | Jan. 19, 1937 |
| 2,204,779 | Swennes | June 18, 1940 |
| 2,258,684 | Lysholm et al. | Oct. 14, 1941 |
| 2,272,434 | Schjolin | Feb. 10, 1942 |
| 2,293,787 | Worden | Aug. 25, 1942 |
| 2,301,957 | Lang | Nov. 17, 1942 |

UNITED STATES PATENTS

| | | |
|---|---|---|
| 2,324,733 | Smirl | July 20, 1943 |
| 2,418,378 | Voytech | Apr. 1, 1947 |
| 2,422,155 | Wemp | June 10, 1947 |
| 2,488,478 | Roberts | Nov. 15, 1949 |
| 2,505,450 | Wemp | Apr. 25, 1950 |
| 2,512,360 | McLean | June 20, 1950 |
| 2,529,400 | Lapsley | Nov. 7, 1950 |
| 2,533,919 | Wilson | Jan. 29, 1951 |
| 2,547,236 | Swenson | Apr. 3, 1951 |
| 2,548,207 | Dunn | Apr. 10, 1951 |
| 2,557,421 | Evernden | June 19, 1951 |
| 2,562,515 | Wemp | July 31, 1951 |
| 2,568,007 | Jandasek | Sept. 18, 1951 |
| 2,583,556 | Fleischel | Jan. 29, 1952 |
| 2,620,684 | McFarland | Dec. 9, 1952 |
| 2,648,992 | Vincent | Aug. 18, 1953 |

FOREIGN PATENTS

| | | |
|---|---|---|
| 644,545 | Germany | May 7, 1937 |